United States Patent [19]

Yamashita et al.

[11] 4,340,624
[45] Jul. 20, 1982

[54] ELECTROCHROMIC DISPLAY DEVICE

[75] Inventors: Akio Yamashita; Shirow Asakawa, both of Kawasaki, Japan

[73] Assignee: Matsushita Electric Industrial Co., Ltd., Osaka, Japan

[21] Appl. No.: 197,328

[22] Filed: Oct. 15, 1980

[30] Foreign Application Priority Data

Oct. 17, 1979 [JP] Japan ................................ 54-134577

[51] Int. Cl.³ ............................ C09K 3/34; G02F 1/13
[52] U.S. Cl. ........................................ 428/1; 350/330; 204/280
[58] Field of Search ..................... 428/1, 35, 411, 702; 350/160 LC, 330; 252/299

[56] References Cited

U.S. PATENT DOCUMENTS 4,003,633 1/1977 Yamashita ................................ 428/1

*Primary Examiner*—Marion McCamish
*Attorney, Agent, or Firm*—Lowe, King, Price & Becker

[57] ABSTRACT

An electrochromic display device comprising a pair of electrodes which are disposed with a specified space therebetween, at least one of the electrodes being transparent, and a non-aqueous electrolytic solution filled in the space and comprised of a styryl-like compound and a supporting electrolyte dissolved in a solvent, the styryl-like compound being represented by the formula:

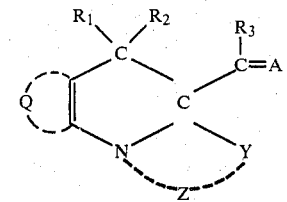

in which Q represents a benzene ring with or without substituents and/or a condensed ring, $R_1$ and $R_2$ independently represent a lower alkyl group, a hydroxyalkyl group or an alkoxyalkyl group, $R_3$ represents hydrogen, an alkyl group, an alkoxy group, a halogen, a nitrile group, an aromatic group or a phenoxy group, Y represents oxygen or sulfur, Z represents an alkylene group of 2 to 4 carbon atoms, with or without an alkyl substituent, required to complete a ring structure together with

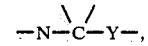

and A represents a residue resulting from a condensation reaction of the methyl group of methylene group in the 2-position of a precursor indoline derivative of the formula:

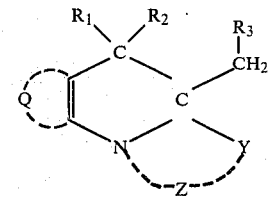

where Q, $R_1$, $R_2$, $R_3$, Y and Z have the same meanings as defined above with a member selected from the group consisting of aromatic aldehydes, heterocyclic aldehydes, aromatic nitroso compounds and heterocyclic nitroso compounds.

8 Claims, 1 Drawing Figure

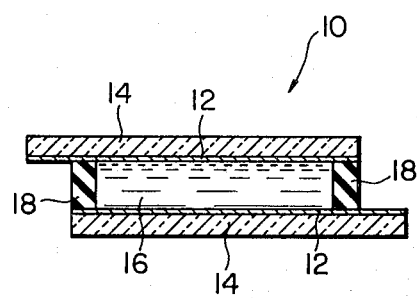

ELECTROCHROMIC DISPLAY DEVICE

BACKGROUND OF THE INVENTION

1. Field of the Invention

This invention relates to display devices and more particularly, to electrochromic display devices using non-aqueous electrolytic systems of styryl-like compounds or dyes of a specific type which exhibit electrochromic behavior.

2. Description of the Prior Art

Electrochromic display devices making use of styryl-like compounds have been described in U.S. Pat. No. 4,003,633, issued to Akio Yamashita, in which the styryl-like compounds are dissolved in a liquid crystal and a color development is based on a principle that the solution is oriented by application of an electric field. By the application, a steric effect is produced on the styryl compound whereupon the ring of the compound is opened, resulting in generation of color. When the electric field is removed, the orientation of the liquid crystal is disturbed and the styryl-like compound restores its original ring-closed colorless structure. However, this color-generating system is relatively low in electrochromic efficiency. In order to increase such an efficiency, surface active agents such as dodecylpyridinium chloride, cetylpyridinium bromide or the like, stabilizing agents such as p-benzoquinone and/or electron-donating materials such as HCl, pyridinium salts, ammonium salts are added to the liquid crystal solution.

SUMMARY OF THE INVENTION

It is an object of the invention to provide an electrochromic display device which is worked based on a principle completely different from the known one using styryl-like compounds.

It is another object of the invention to provide an electrochromic display device which has a great elecrochromic efficiency.

It is a further object of the invention to provide an electrochromic display device which comprises non-aqueous solutions of styryl-like compounds and supporting electrolytes in solvents.

It is a further object of the invention to provide an electrochromic display device whose electrodes suffer a reduced degree of deterioration.

The above objects can be achieved by an electrochromic display device which comprises a pair of electrodes which are disposed with a specified space therebetween, at least one of the electrodes being transparent, and a non-aqueous electrolytic solution filled in the space and comprised of a styryl-like compound and a supporting electrolyte dissolved in a solvent, the styryl-like compound being represented by the formula:

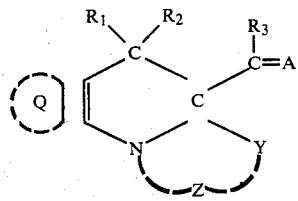

in which Q represents a benzene ring with or without substituents and/or a condensed ring, $R_1$ and $R_2$ are independently a lower alkyl group, a hydroxyalkyl group or an alkoxyalkyl group, $R_3$ represents hydrogen, an alkyl group, an alkoxy group, a halogen, a nitrile group, an aromtic group or a phenoxy group, Y represents oxygen or sulfur, Z represents an alkylene group of 2 to 4 carbon atoms, with or without an alkyl substituent, required to complete a ring structure together with

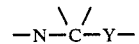

and A represents a residue resulting from a condensation reaction of the methyl group or methylene group in the 2-position of a precursor indoline derivative of the formula:

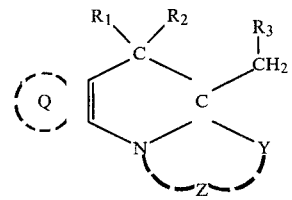

where Q, $R_1$, $R_2$, $R_3$, Y and Z have the same meanings as defined above with a member selected from the group consisting of aromatic alkehydes, heterocyclic aldehydes, aromatic nitroso compounds and heterocyclic nitroso compounds.

BRIEF DESCRIPTION OF THE DRAWING

The FIGURE is a schematic view, in section, of an electrochromic display device according to the invention.

EMBODIMENTS OF THE INVENTION

Referring to the sole FIGURE, there is schematically shown an electrochromic display device 10 which includes a pair of electrodes 12,12 spaced apart from each other at a distance and each formed on one surface of a plate 14 such as of glass or transparent plastic resins. At least one of the electrodes should be transparent and is made of indium oxide or tin oxide. If the other electrode is designed to be opaque, any metals may be used as the electrode. In between the electrodes 12,12 is filled or placed a non-aqueous electrolytic solution 16. A spacer 18 is disposed between the plates 14,14 at the marginal portions thereof, so that the solution is held in position. The devices may be in any form such as a rectangle, a disc and the like.

In an ordinary display device, the electrodes are divided into segments and when it is desired to develop a color in a desired form, a potential is applied between selected segments of the electrodes.

The arrangement of such a display device is well known in the art and is not further described in detail herein.

The invention will be described with regard to the non-aqueous electrolytic solution which characterizes the present invention.

The electrolytic solution used in the invention is substantially composed of three components, i.e. a supporting electrolyte, a styryl-like compound or dye, and a solvent for the electrolyte and compound.

The electrolytes useful in the present invention are neutral ones which comprise cations including alkali metal ions such as $Li^+$, $Na^+$, $K^+$, $Rb^+$, $Cs^+$ and the like, and ammonium or quaternary alkylammonium ions such as $NH_4^+$, $Me_4N^+$, $Et_4N^+$ (n-propyl)$_4N^+$, (n-butyl)$_4N^+$, (n-$C_6H_{13}$)$_4N^+$, and the like. Further, alkaline earth metal ions such as $Ca^{2+}$, $Mg^{2+}$ and the like, and organic cations in which the alkyl group of the quaternary alkylammonium ions is replaced by an aryl group or an aralkyl group may be likewise used. Additionally, instead of the quaternary alkylammonium ions, there may be also used quaternary alkylphosphonium ions ($R_4P^+$), quaternary alkylarsenium ions ($R_4As^+$), and tertiary alkylsulfonium ions ($R_3S^+$). Preferably, quaternary alkylammonium ions are used.

Anions of the electrolytes include halogen ions such as $Cl^-$, $Br^-$ $I^-$ and the like, $OS_4^{2-}$, $NO_3^-$, $ClO_4^-$, various sulfonic acid ions such as, for example, p-toluenesulfonic acid ions, various carboxylic acid ions, tetrafluoroboric acid ions, $PF_6^-$, and the like. These cations and anions may be optionally combined to give various types of salts which are useful as the supporting electrolyte in the practice of the invention. Any of salts falling within the scope of the invention may be used singly or in combination. Preferable electrolytes include alkylammonium perchlorates and alkylammonium tetrafluoroborates.

As is known in the art, the electrochromic reaction as in the present invention is satisfactorily achieved in non-aqueous solvents. Useful solvents are, for example, phosphoric esters such as tricresyl phosphate, cresyl phosphate and the like, amides such as N,N-di-methylformamide, methylpropionamide, N-methylpyrrolidone, hexamethylphosphonamide, diethylformamide, tetramethylurea and the like, nitriles such as acetonitrile, sulfoxides such as dimethylsulfoxide, esters such as ethyl acetate, butyl acetate, dioctyl phthalate and the like, carbonates such as propylene carbonate, ethylene carbonate and the like, lactones such as γ-butyrolactone, ketones such as methyl ethyl ketone, methyl isobutyl ketone and the like. These solvents may be used singly or in combination. A wider range of a difference between a boiling temperature and a melting point of solvent results in a wider range of application temperatures. In this sense, if it is desired to make an application temperature wider, propylene carbonate, dimethylformamide, and the like solvents are preferably used. The viscosity of the solvent gives an influence on the response speed of the electrochromic coloration. When higher response speeds are needed, solvents of low viscosity such as acetonitrile are used.

The styryl-like compounds useful in the invention have the following general formula:

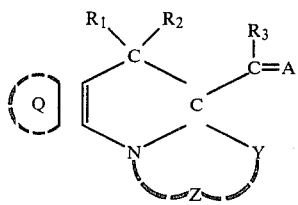

In the above formula: Q represents a benzene ring with or without substituents and/or a condensed ring; $R_1$ and $R_2$ independently represent a lower alkyl group, a lower hydroxyalkyl group, or a lower alkoxyalkyl group; $R_3$ represents hydrogen, a lower alkyl group, an alkoxy group, a halogen, a nitrile group, an aromatic group or a phenoxy group; Y represents oxygen (O) or sulfur (S); Z represents an alkylene group of 2 to 4 carbon atoms, with or without an alkyl substituent, required to complete a ring structure together with

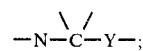

and A represents a residue resulting from the condensation reaction using an aromatic aldehyde, a heterocyclic aldehyde, an aromatic nitroso compound or a heterocyclic nitroso compound.

In a more specific aspect, Q represents a benzene ring of the following formula:

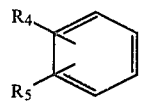

in which $R_4$ and $R_5$ independently represent hydrogen, a nitro group, a lower alkyl group, a lower alkoxy group, a halogen, an acetoamino group, an alkylamino group, a dialkylamino group, a hydroxy group or an alkoxycarbonyl group, or Q represents a benzene ring condensed with one or more of benzene rings at 4,5-, 6,7- or 5,6-positions. Typical of a condensed benzene ring is represented by

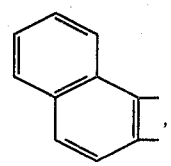

Where at least one of $R_4$ and $R_5$ is other than hydrogen, the substituent has a tendency of being jointed at 5 position of the ring.

Examples of the aromatic aldehyde represented by A include benzoaldehyde, p-acetaminobenzoaldehyde, p-bromobenzoaldehyde, m-bromobenzoaldehyde, o-bromobenzoaldehyde, p-dimethylaminobenzoaldehyde, p-diethylaminobenzoaldehyde, p-dibutylaminobenzoaldehyde, o-chlorobenzoaldehyde, p-chlorobenzoaldehyde, p-anisaldehyde, o-anisaldehyde, p-tolualdehyde, m-tolualdehyde, o-tolualdehyde, o-ethoxybenzoaldehyde, p-ethoxybenzoaldehyde, p-fluorobenzoaldehyde, o-fluorobenzoaldehyde, m-nitrobenzoaldehyde, o-nitrobenzoaldehyde, p-cyanobenzoaldehyde, o-cyanobenzoaldehyde, 2,4-dichlorobenzoaldehyde, 2,6-dichlorobenzoaldehyde, 3,4-dichlorobenzoaldehyde, 3,5-dichlorobenzoaldehyde, 2,4-dimethoxybenzoaldehyde, 2,5-dimethoxybenzoaldehyde, 3,4-dimethoxybenzoaldehyde, 3,5-dimethoxybenzoaldehyde, 2,4-dimethoxybenzoaldehyde, 2,5-dimethylbenzoaldehyde, 3,4-dimethoxybenzoaldehyde, 3,5-dimethylbenzoaldehyde, veratraaldehydo(3,4-dimethoxybenzoaldehyde), 4-isopropylbenzoaldehyde, o-(2-chloroethyl)-benzoaldehyde 2,4,6-trimethylbenzoaldehyde(mesitaldehyde), 2,4,6-triethoxybenzoaldehyde, 3,4-dimethyl-p-anisaldehyde, 2,5-dimethyl-p-anisaldehyde, 2-chloro-5-nitrosobenzoaldehyde, 2-chloro-6-nitrobenzoaldehyde, 2-chloro-3-nitrobenzoaldehyde, 6-chloro-2-nitrobenzoaldehyde, vanillin, o-vanillin, isovanillin, 5-bromo-vanillin, 2-chloro-4-dimethyllaminobenzoaldehyde, 2-chloro-6-fluorobenzoaldehyde, 5-bromoveratraaldehyde, 6-bromoveratraaldehyde, 5-bromo-2- methoxybenzoaldehyde, 1-naphthoaldehyde, 2-naphthoaldehyde, p-dimethylaminocinnamaldehyde, p-diethylcinnamaldehyde, p-nitrocinnamaldehyde, o-nitrocinnamaldehyde, 2-chlorocinnamaldehyde, 9-anthraldehyde, o-chloro-9-anthraldehyde, 9-phenanthrenecarboxaldehyde, fluorenecarboxaldehyde and the like.

Examples of the aromatic nitroso compound include p-dimethylaminonitrosobenzene, p-diethylaminonitrosobenzene, p-methylnitrosobenzene(p-nitrosotoluene), p-nitronitrosobenzene, o-nitronitrosobenzene, 3-nitroso-2-nitrotoluene and the like.

Examples of the heterocyclic aldehyde include furfural, 5-methylfurfural, 5-bromofurfural, 4-isopropylfurfural, 2-thiophenecarboxaldehyde, 5-methylthiophenecarboxaldehyde, 3-methoxybenzothiophene-2-carboxaldehyde, 2-pyridinecarboxaldehyde, 3-pyridinecarboxaldehyde, 4-pyridinecarboxaldehyde, 1-ethylindole-3-carboxaldehyde, 1-methylindole-3-carboxaldehyde, 1-methyl-2-phenylindole-3-carboxaldehyde, N-methylcarbazole-2-carboxaldehyde, N-ethyl-7-bromocarbazole-2-carboxaldehyde, N-(n-octyl)-7-nitrocarbazole-2-carboxaldehyde, benzofuran-2-carboxaldehyde, dibenzofuran-2-carboxaldehyde, pyrrole-2-aldehyde, N-methylpyrrole-2-aldehyde, N-phenylpyrrole-2-aldehyde, 3-methylpyrrole-2-aldehyde, 2-ethylpyrrole-5-aldehyde, benzothiazole-2-aldehyde, 6-methylbenzothazole-2-aldehyde, 6-chlorobenzothiazole-2-aldehyde, 5-chlorobenzothiazole-2-aldehyde, 6-methoxybenzothiazole-2-aldehyde, 5,6-dichlorobenzothiazole-2-aldehyde, benzoselenazole-2-aldehyde, 6-methoxybenzoselenazole-2-aldehyde, 2,4-dimethylpyrrole-2-aldehyde, 4,6-dichloropyrimidine-5-carboxaldehyde, 2-formyl-4,6-dimethylpyrimidine, quinoline-2-aldehyde, acridine-10-aldehyde, 2,4-diphenyl-5,6,7-hexahydrobenzopyran-8-carboxaldehyde, 2,4-diphenyl-6-methyl-5,6,7-pentahydrobenzopyran-8-carboxaldehyde, and the like.

Examples of the heterocyclic nitroso compound include 3-nitrosoindole, 2-methyl-3-nitrosoindole(3-nitrosomethylketone), 3-nitroso-2-phenylindole, and the like.

Specific examples of the styryl-like compound are shown together with their maximum absorption wavelengths in the ring-closed state and in the ring-opened state.

1. 3,3-dimethyl-2-(p-dimethylaminostyryl)indolino[1,2-b]oxazoline

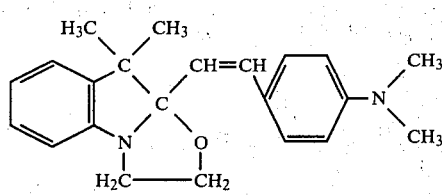

maximum absorption wavelength
ring closed structure: 296 nm
ring opened structure: 547 nm 2. 3,3-dimethyl-5-methoxy-2-(para-dimethylaminostyryl)indolino[1,2-b]oxazoline

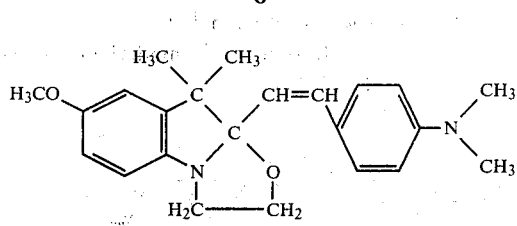

maximum absorption wavelength
ring closed structure: 297 nm
ring opened structure: 542 nm 3. 3,3-dimethyl-5-nitro-2-(para-dimethylaminostyryl)indolino[1,2-b]oxazoline

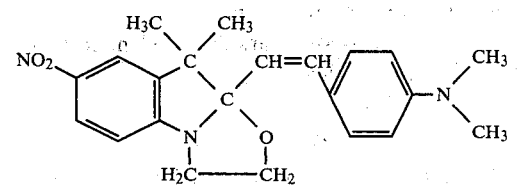

maximum absorption wavelength
ring closed structure: 303 nm
ring opened structure: 580 nm 4. 3,3,5-trimethyl-2-(para-dimethylaminostyryl)indolino[1,2-b]oxazoline

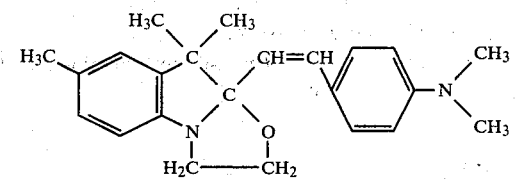

maximum absorption wavelength
ring closed structure: 297 nm
ring opened structure: 547 nm 5. 3,3-dimethyl-2-(para-chlorostyryl)indolino[1,2-b]oxazoline

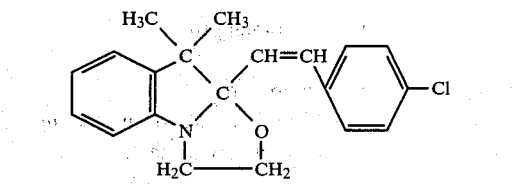

maximum absorption wavelength
ring closed structure: 259 nm
ring opened structure: 392 nm 6. 3,3-dimethyl-5-chloro-2-(para-chlorostyryl)indolino[1,2-b]oxazoline

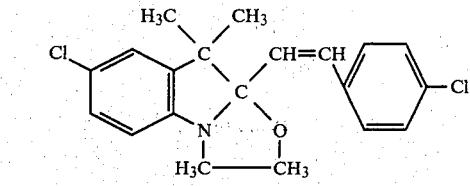

maximum absorption wavelength
ring closed structure: 255 nm ring opened structure: 398 nm 7. 3,3-dimethyl-5-chloro-2-(para-dimethylaminostyryl)indolino[1,2-b]oxazoline

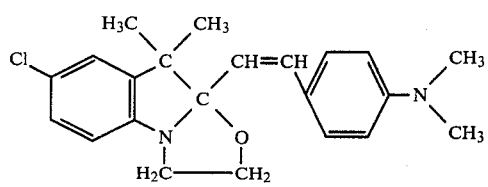

maximum absorption wavelength
ring closed structure: 299 nm
ring opened structure: 557 nm 8. 3,3-dimethyl-5-iodo-2-(para-dimethylaminostyryl)indolino[1,2-b]oxazoline

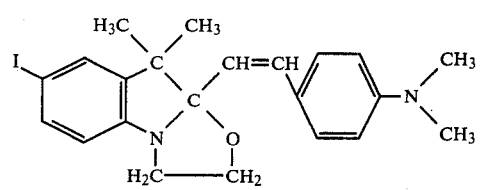

maximum absorption wavelength
ring closed structure: 298 nm
ring opened structure: 561 nm 9. 3,3-dimethyl-4,5-benzo-2-(para-dimethylaminostyryl)indolino[1,2-b]oxazoline

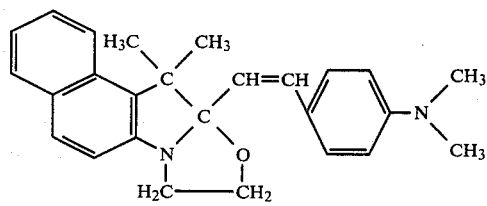

maximum absorption wavelength
ring closed structure: 298 nm
ring opened structure: 560 nm 10. 3,3-dimethyl-4,5-benzo-2-(para-dimethylaminostyryl)indolino[1,2-b]-1,3-tetrahydroxazine

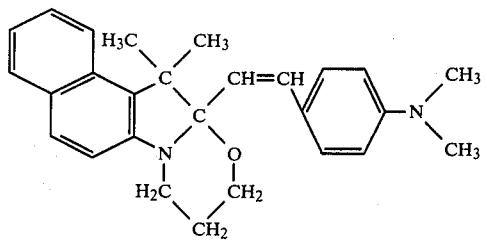

maximum absorption wavelength
ring closed structure: 304 nm
ring opened structure: 563 nm 11. 3,3-dimethyl-2-(para-dimethylaminocinnamylidenevinyl)indolino[1,2-b]oxazoline

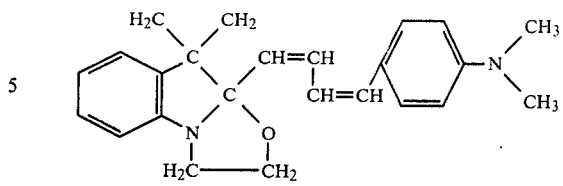

maximum absorption wavelength
ring closed structure: 328 nm
ring opened structure: 618 nm 12. 3,3-dimethyl-5-chloro-2-(para-dimethylaminocinnamylidenevinyl)indolino[1,2-b]oxazoline

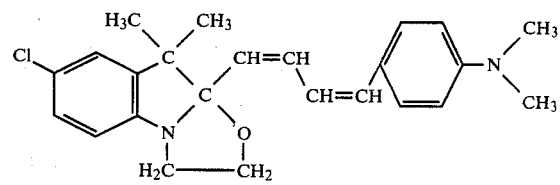

maximum absorption wavelength
ring closed structure: 338 nm
ring opened structure: 635 nm 13. 3,3-dimethyl-5-methoxy-2-(para-dimethylaminocinnamylidenevinyl)[1,2-b]oxazoline

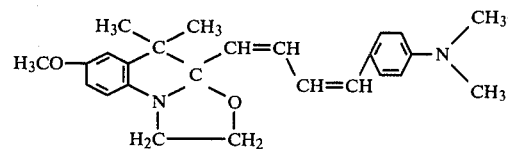

maximum absorption wavelength
ring closed structure: 326 nm
ring opened structure: 594 nm 14. 3,3-dimethyl-2-(para-dimethylamino-2-azastyryl)indolino[1,2-b]oxazoline

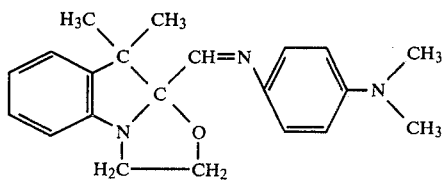

maximum absorption wavelength
ring closed structure: 290 nm
ring opened structure: 587 nm 15. 3,3-dimethyl-5-methoxy-2-(para-dimethylamino-2-azastyryl)indolino[1,2-b]oxazoline

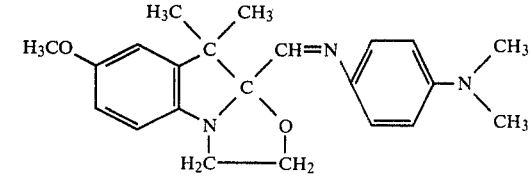

maximum
ring closed structure: 271 nm
ring opened structure: 589 nm 16. 3,3-dimethyl-5-chloro-2-(para-dimethylamino-2-azastyryl)indolino[1,2-b]oxazoline

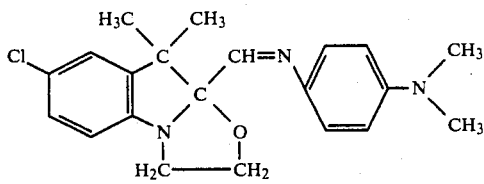

maximum absorption wavelength
ring closed structure: 301 nm
ring opened structure: 600 nm 17. 3,3-dimethyl-2-(para-methoxystyryl)indolino[1,2-b]-1,3-tetrahydroxazine

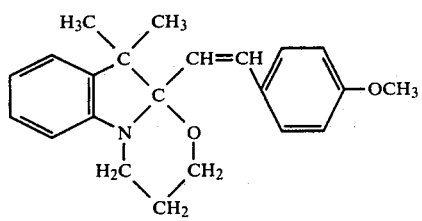

maximum absorption wavelength
ring closed structure: 264 nm
ring opened structure: 423 nm 18. 3,3-dimethyl-5-chloro-2-(para-dimethylaminostyryl)indolino[1,2-b]-thiazoline

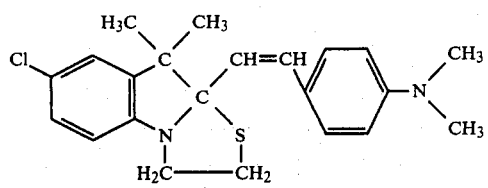

maximum absorption wavelength
ring closed structure: 408 to 410 nm
ring opened structure: 538 to 540 nm 19. 3,3-dimethyl-2-{2-(9-methylcarbazolyl)-vinyl}indolino[1,2-b]oxazoline

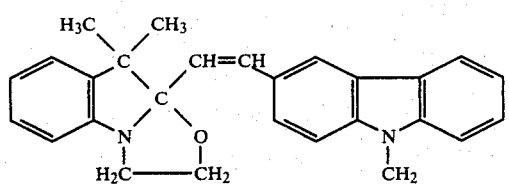

maximum absorption wavelength
ring closed structure: 284 to 285 nm
ring opened structure: 500 to 502 nm These compounds have been already described in the afore-indicated U.S. patent which will be incorporated herein by reference. So, preparation of the compounds is briefly described.

In short, the styryl-like compounds can be prepared by a dehydrating condensation reaction of a methyl group or methylene group in 2 position of an indoline derivative of the formula:

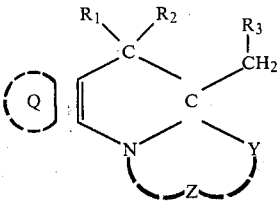

and of the aldehyde group of an aromatic or hetrocyclic aldehyde or the nitroso group of an aromatic or heterocyclic nitroso compound or by a treatment, with an alkali, of styryl dyes of the formula:

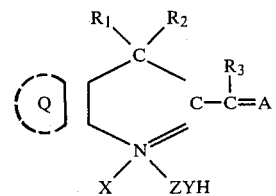

where X represents an anion such as a halogen, an acid residue or an alkoxy radical.

In the electrochromic system according to the invention, an electro-chemical reaction takes place in order to form a material which is able to absorb a specific wavelength or a color, i.e. color formation reaction between the supporting electrolyte and the styryl-like compound occurs in the non-aqueous electrolytic solution. The electrochromic coloration mechanism is considered to be as follows: A styryl-like compound is anodized at an anode of an electrochromic device to produce cation radicals simultaneously with the

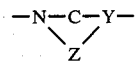

bonding being opened, and the radicals are stabilized by combination with anions of a supporting electrolyte to develop a color.

Since the coloration reaction is electro-chemically balanced, it can proceed reversibly. The bleaching of once formed color may be achieved in a symmetrically arranged cell by opening or short-circuiting the cell or by instantaneously applying a potential of opposite polarity to the cell.

In the practice of the invention, the amount of the styryl-like compound is generally in the range of $1\times10^{-5}$–1 mol/l, preferably $1\times10^{-1}$–$1\times10^{-2}$ mol/l. Less amounts are unfavorable since a satisfactory level of color intensity can not be obtained. Larger amounts are disadvantageous because segregation of the styryl-like compound itself may result. The supporting electrolyte is generally used in an amount ranging $1\times10^{-5}$–10 mol/l.

Generation color may be varied more or less depending on types of solvent and styryl-like compound.

The potential to be applied across the electrodes is generally in the range of $1\times10$–$1\times10^4$ volts/cm, preferably $1\times10^2$–$1\times10^3$ volts/cm.

The present invention is particularly described by way of examples, which should not be construed as limiting the present invention.

EXAMPLE 1

A transparent solution, in acetonitrile, of 0.1 mol/l of tetrabutylammonium perchlorate and 0.005 mols/l of 3,3-dimethyl-2-(p-dimethylaminostyryl)-indolino[1,2-b]oxazoline of the formula

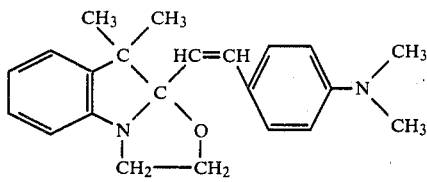

was prepared. The solution was set between two transparent $SnO_2$ electrodes arranged in parallel at a distance of about 0.5 mm. A potential was applied across the electrodes, with the result that the transparent solution turned into red in color. When the potential was removed, the color was bleached.

EXAMPLE 2

Example 1 was repeated using tricresyl phosphate as a solvent.

Similarly, the solution was placed between two transparent $SnO_2$ electrodes spaced apart at a distance of 0.5 mm. Then, a constant electric current of about 10 $\mu Q$ was passed between the electrodes by a constant current method. The optical density (OD) was measured by the use of a visible light spectrograph. After a certain period, a current passing between the electrodes was also measured. From the measured values, an optical density per milli-coulmb/cm² was calculated. In general, the optical density/mc/cm² is called an efficiency of the cell. In this example the efficiency was found to be 0.5 OD/mc/cm².

EXAMPLE 3

A solution, in N-methylpyrrolidone, of 0.1 mol/l of sodium perchlorate and 0.005 mols/l of 3,3-dimethyl-2-(p-dimethylaminocinnamylidenevinyl)indolino[1.2-b]oxazoline of the formula

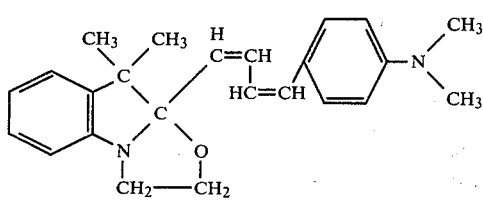

was prepared. Then, the solution was tested in the same manner as in Example 1, with the result of an efficiency of 0.43 OD/mc/cm² and of generation of blue in color.

EXAMPLE 4

Example 3 was repeated using dimethylsulfoxide as a solvent. As a result, the efficiency was found to be 0.37 OD/mc/cm².

EXAMPLE 5

A solution, in tetrahydrofuran, of 0.1 mol/l of lithium perchlorate and 0.01 mol/l of 3,3-dimethyl-2-(p-dimethylaminostyryl)indolino[1,3-b]thiazoline of the formula

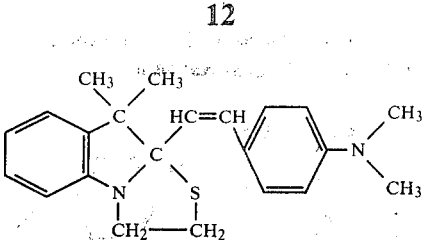

was prepared.

The solution was tested in the same manner as in Example 1, revealing that the solution reversibly colored from yellow to red. Then, the solution was tested in the same manner as in Example 2 to obtain an electrochromic efficiency of 0.15 OD/mc/cm².

EXAMPLE 6

Characteristic properties other than the electrochromic efficiency of an electrochromic element of the invention are shown in this example.

Example 4 was repeated using 0.1 mol of tetrabutylammonium perchlorate instead of sodium perchlorate thereby forming a cell. The cell had the following characteristics:

| | |
|---|---|
| Electrochromic efficiency | 0.65 OD/mc/cm² |
| Applied voltage | 5 volts |
| Time required for color formation | 0.5 seconds |
| Color | red |

The bleaching was effected under conditions as follows:

| | |
|---|---|
| Applied voltage | −2 volts |
| Time | 0.2 second. |

EXAMPLE 7

Example 1 was repeated using tetraethylammonium perchlorate instead of tetrabutylammonium perchlorate. The resulting cell had the following characteristic properties:

| | |
|---|---|
| Electrochromic efficiency | 0.5 OD/mc/cm² |
| Applied voltage | 1.5 volts |
| Time | 0.8 seconds |
| Color | red |

A wide variety of colors could be developed in accordance with the device of the invention. For instance, 3,3-dimethyl-5-chloro-2-(p-dimethylaminostyryl)indolino[1,2-b]oxazoline of the formula

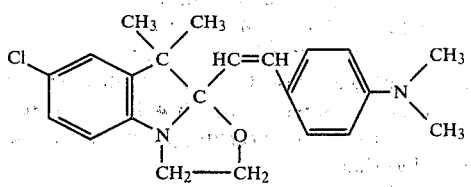

turns colorless to yellow and when mixed with the dye of Example 3, it became green in color.

What is claimed is:

1. An electrochromic display device comprising a pair of electrodes which are disposed with a specified space therebetween, at least one of said electrodes being transparent, and a non-aqueous electrolytic solution filled in the space and comprised of a styryl-like compound and a supporting electrolyte dissolved in a solvent, said styryl-like compound being represented by the formula:

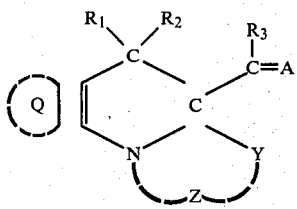

in which Q represents a benzene ring with or without substituents and/or a condensed ring, $R_1$ and $R_2$ independently represent a lower alkyl group, a hydroxyalkyl group or an alkoxyalkyl group, $R_3$ represents hydrogen, an alkyl group, an alkoxy group, a halogen, a nitrile group, an aromatic group or a phenoxy group, Y represents oxygen or sulfur, Z represents an alkylene group of 2 to 4 carbon atoms, with or without an alkyl substituents, required to complete a ring structure together with

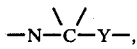

and A represents a residue resulting from a condensation reaction of the methyl group or methylene group in the 2-position of a precursor indoline derivative of the formula:

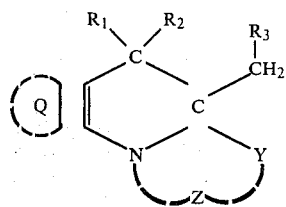

where, $R_1$, $R_2$, $R_3$, Y and Z have the same meanings as defined above, respectively, with a member selected from the group consisting of aromatic aldehydes, heterocyclic alcehydes, aromatic nitroso compounds and heterocyclic nitroso compounds.

2. The device according to claim 1, wherein Q is a benzene ring of the formula:

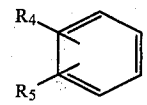

in which $R_4$ and $R_5$ independently represent hydrogen, a nitro group, a lower alkyl group, a lower alkoxy group, a halogen, an acetoamino group, an alkylamino group, a dialkylamino group, a hydroxy group or an alkoxycarbonyl group.

3. The device according to claim 1, wherein Q represents a benzene ring condensed with one or more of benzene rings.

4. The device according to claim 1, wherein said supporting electrolyte is used in an amount of $1 \times 10^{-5}$ to 10 mol/l and said styryl-like compound is used in an amount of $1 \times 10^{-5}$ to 1 mol/l.

5. The device according to claim 4, wherein said styryl-like compound is used in an amount of $1 \times 10^{-1}$ to $1 \times 10^{-2}$ mol/l.

6. The device according to claim 1, wherein a potential to be applied across the electrodes is in the range of $1 \times 10 - 1 \times 10^4$ volts/cm.

7. The device according to claim 1, wherein the solvent is propylene carbonate or dimethylformamide.

8. The device according to claim 1, wherein the solvent is acetonitrile.